July 30, 1957  S. R. LOGAN  2,801,061
JOINT SEAL

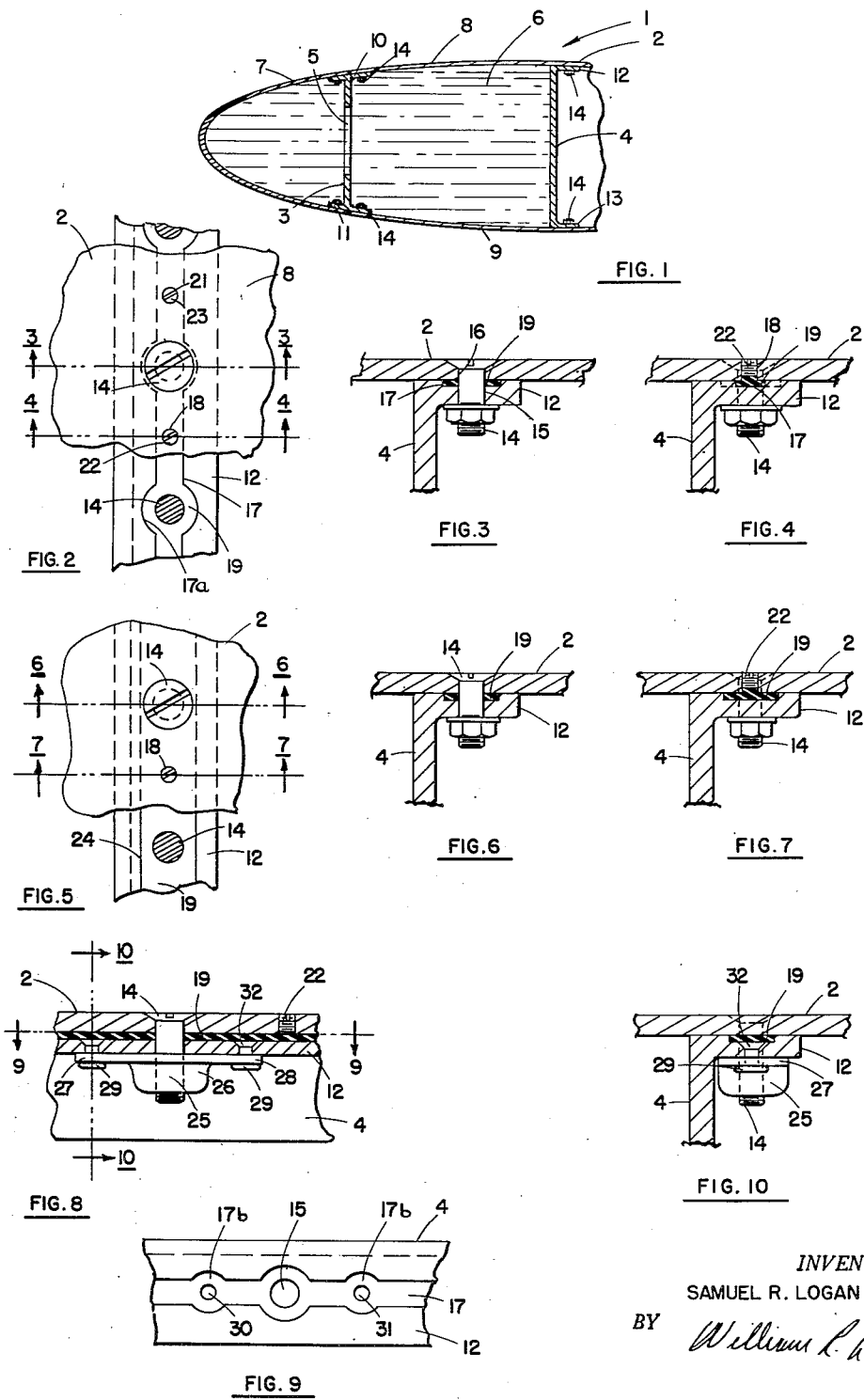

Filed Jan. 5, 1953  2 Sheets-Sheet 2

INVENTOR.
SAMUEL R. LOGAN
BY
*William R. Lane*
ATTORNEY

United States Patent Office 2,801,061
Patented July 30, 1957

2,801,061
JOINT SEAL

Samuel R. Logan, Fresno, Calif., assignor to North American Aviation, Inc.

Application January 5, 1953, Serial No. 329,625

4 Claims. (Cl. 244—135)

This invention pertains to a joint seal, and more particularly to a seal for rigid members held together by fasteners.

The need for an adequate seal between rigid members held together by fasteners has become very apparent in connection with modern aircraft wherein maximum fuel capacity and minimum weight are essential. If such a seal can be successfully provided portions of the aircraft structure can serve as sides to the fuel tanks. For example, the skin of the aircraft may serve as one or more of the sides of the fuel tank, thereby permitting the maximum volume defined by the aircraft structure to be used for fuel storage, and also eliminating excess weight due to internally carried tanks. An aircraft structure is, of course, held together by fasteners such as rivets and bolts, and leakage around these fasteners at the joints and between the abutting sheet metal members becomes a severe problem. Gaskets of various types have proved unsatisfactory because of inability to seal when the fuel tanks are subjected to pressure, as encountered with high performance airplanes, and because it is difficult to seal around bolts by means of O-rings or other types of gaskets. Such a seal, even when successfully obtained, necessitates considerable time in production, and requires the use of a large number of parts.

Often a fillet-type seal is used in which a fillet of sealant material is laid along the junctures of the sides of the tanks in the interior of the tank. The sealant is of the type which then hardens into a solid material and serves to prevent leakage past the joint. This type of seal has the obvious disadvantage of requiring access to the interior of the tank so that it is usable only for large sized tanks. Furthermore, it is very costly to repair such a seal and the initial forming of the seal is also slow and expensive.

Therefore it is an object of this invention to provide a seal between mating rigid parts.

Another object of this invention is to provide a seal which will extend the length of adjoining parts and will additionally seal around fasteners securing the parts together.

A further object of this invention is to provide a seal that is adapted to mass production techniques.

An additional object of this invention is to provide a seal that will be operative both for the fasteners and the adjoining rigid parts, and will seal around a nut plate as well.

Yet another object of this invention is to provide a seal which is accessible from the exterior of a tank.

A still further object of this invention is to provide a seal which, if broken, can be resealed without any disassembly of the tank.

These and other objects of invention will become apparent from the following detailed description taken in connection with the accompanying drawings, in which:

Fig. 1 is a cross-sectional view of a fuel tank integral with an airplane wing;

Fig. 2 is a top plan view of a fragment of the tank of Fig. 1;

Fig. 3 is a sectional view along line 3—3 of Fig. 2;

Fig. 4 is a sectional view along line 4—4 of Fig. 2;

Fig. 5 is a top plan view of a modification wherein the sealant groove is of constant width;

Fig. 6 is a sectional view along line 6—6 of Fig. 5;

Fig. 7 is a sectional view along line 7—7 of Fig. 5;

Fig. 8 is a side elevation, partly in section, showing a nut plate attachment;

Fig. 9 is a top plan view showing the inner member prior to attaching a nut plate;

Fig. 10 is a sectional view along line 10—10 of Fig. 8;

Figure 11:
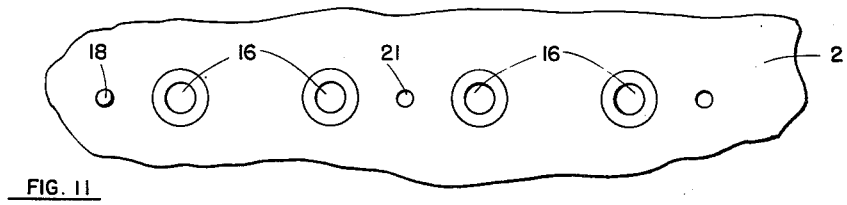
Fig. 11 is a top plan view of the outer member prior to assembly.
Figure 12:
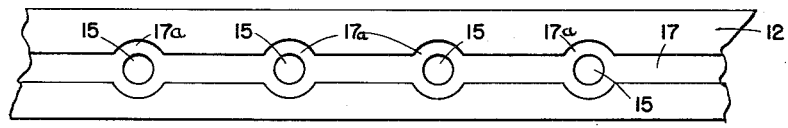
Fig. 12 is a top plan view of the inner member prior to assembly.

The joint seal of this invention is particularly applicable in sealing a structure such as a tank held together by fasteners, especially a fuel tank for an airplane. A fuel tank by the provisions of this invention may be integral with the aircraft structure so that portions of the structure are used in defining the volume of the fuel tank. Thus as illustrated in Fig. 1, an aircraft wing 1 may have skin 2, a supporting beam 3, and a bulkhead 4, defining the sides of a fuel tank. Beam 3 may have, for example, an enlarged opening 5 extending through the beam so as to provide a single fuel retaining receptacle adapted to contain fuel 6. Skin 2 may be in various sections, such as forward section 7 and intermediate sections 8 and 9 adjoining the forward section. Beam 3 and bulkhead 4 have at their end flanges 10 and 11, and 12 and 13, respectively. The skin sections are secured to these flanges by means of fasteners 14, such as bolts or rivets, which extend through the skin and the flanges. Preferably these fasteners are of the flush type which may be countersunk into the skin so as to provide a smooth streamlined exterior. As shown in Figure 1, section 7 abuts sections 8 and 9 at the locations of flanges 10 and 11, while the latter sections extend over and beyond flanges 12 and 13. In any event the skin sections overlap another surface either where they join or at the limits of the tank, which surfaces are flanges in the embodiment illustrated in Fig. 1, thus providing mating marginal elements.

It becomes necessary with such an integral fuel tank construction to prevent leakage out of the tank to the exterior of the aircraft where section 7 joins section 8 and section 9. Additionally, it is necessary to prevent leakage to the interior of the aircraft from between member 4 and sections 8 and 9. The tank must be sealed along the length of its joints and around each fastener as well. According to this invention, a simple, perfectly sealed joint may be provided for such a tank.

In providing the seal of this invention a plurality of apertures 15 are provided in the flanges for receiving the fasteners when the unit is assembled. Additional apertures 16 are provided in the skin and are alignable with apertures 15. These apertures are normally in a spaced relationship in a substantially straight row along the mating overlapping portions. Preferably, apertures 16 on the exterior side of the skin will be countersunk whereby when the unit is assembled the tapered heads of fasteners 14 may be received wholly within the apertures and be flush with the surface of the skin.

Prior to the assembly of the parts there is provided in either flange 12 or the skin an elongated groove or channel 17, shown here in the flange. This groove extends the length of the joint where the mating portions are in engagement. It extends from each of openings 15 to the next, thus joining these openings. Normally this groove will be made of a lesser width than the apertures 15 at locations between these apertures. However, at the locations of the apertures, the groove is enlarged, as at 17a, so as to encompass the fastener openings. This may be very easily accomplished by spot facing the flange at the locations of apertures 15 thereby widening the groove at those locations. When the parts are later assembled, fasteners 14 extend through the groove and are entirely circumscribed thereby. The exact width and depth of the groove will depend upon the sealant to be used, the pressures to be encountered, and the fuel to be retained in the tank. If the groove is provided in the skin instead of the flange, it will be enlarged at apertures 16 in exactly the same manner as shown for apertures 15.

There is additionally provided at least one aperture 18 which communicates with the groove from the exterior of one of the mating parts. It may be more convenient to provide this aperture through the exterior of the outer member so that it is accessible from the exterior of the fuel-containing receptacle. Thus as illustrated, aperture 18 extends through skin section 8 to the location of the groove in mating flange 12. When the parts are in an assembled relationship a sealant material 19 is injected under pressure through aperture 18. This sealant material is normally of a very viscous fluid, or dough-like consistency, and is forced into the groove so as to entirely fill all the spaces of the groove including around the fasteners at the enlarged portions of the groove. This sealant material is preferably of a non-hardening type which will remain as a very viscous fluid which will not flow unless pressure is introduced through aperture 18. A suitable material of this sort is a non-hardening polysulphide synthetic rubber.

Sealant 19, by completely filling the groove, will prevent passage of fluid past the groove. This seals the joint between the skin section and the overlapping flange so that fluid 6 cannot escape from the interior of the tank along the line of the joint. Because the sealant material entirely surrounds the fasteners, there can be no leakage along the shanks of the fasteners to the exterior of the tank. In this manner there is provided a seal for the entire length of rigid parts joined together and at the same time for each of the fasteners holding the parts in engagement.

There may be provided in the skin a second aperture 21 communicating with the groove which, when the groove is full, will transmit some of the sealant material to the exterior of the skin. This will occur after the groove is filled with sealant, thus giving a good indication when adequate material has been injected into the groove. Aperture 21, of course, could be provided in the flange 12, but for convenience and ease of access will be normally provided in the outer member. This second aperture is also useful in permitting escape of air from the interior of the groove. Furthermore, there may be provided additional openings for injecting fluid along the length of the joint, which is particularly desirable if the joint is a very long one. The sealant material will not have to travel as far in the interior of the groove if it can be injected from several locations and it may be easier to entirely fill the groove if this is done. After the sealant material has been injected, openings 18 and 21 should be closed by means of suitable plugs 22 and 23 threadably received in these openings to prevent the sealant from flowing out of groove 17.

When a series of such apertures has been provided, one means of assuring complete filling of groove 17 is to first inject sealant through one aperture until it appears at the next adjoining aperture. The first aperture may then be plugged and additional sealant injected through this second aperture until it begins to come out of the next following aperture. The second aperture is then plugged and the procedure continued along the length of the joint, moving from one aperture to the next, successively plugging the apertures.

It is thus apparent that this seal is very easily effected after the parts have been installed. Furthermore, the joint can be readily resealed by means of injecting additional non-hardening sealant material should the original seal become broken for any reason.

It should be further observed that by the provisions of this invention the sealant material is located exactly along the line of the fasteners and thus is disposed in the location where the parts are most firmly held together. Also, by sealing along the line of the fastening elements, deflection or other movement of the parts constituting the tank will have little or no effect on the sealant or the strength of the seal. If the seal were disposed to one side of the line of the fasteners, however, any deflection of the parts would also deflect the sealant area, tending to break the seal and permit leakage of fluid from the tank.

According to the modification illustrated in Figs. 5, 6, and 7, the sealant groove 24 is made of a constant width, thus eliminating the necessity for enlarging the groove at the location of the fastener openings. There results, of course, an advantage from the ease of construction where the width of the groove does not vary, but it has the disadvantage of removing more metal from the mating parts than is necessary when the groove is of a minimum width between fastener openings. Where the strength of the parts is critical, as is often the case in aircraft, it is preferable to use the smaller groove enlarged at the fastener openings.

In many instances it is necessary to use a nut plate when it is difficult or impossible to obtain access to the inside of the tank to hold a nut against rotation. Such a nut plate is normally held in place by rivets to the inner member of the abutting adjoining parts. It is, of course, necessary in such cases to seal around the nut plate as well as to seal around the fastener which holds the two parts together. A nut plate 25, as illustrated in Figs. 8 and 10, may include a central threaded portion 26 and two laterally extending flange portions 27 and 28. Such a nut plate may be held to the inner surface of member 12 opposite from the groove in that member, by means of rivets 29 passing through flange portions 27 and 28. Additional apertures 30 and 31 are provided through member 12 to receive rivets 29. Groove 17 may be provided in the usual way so as to allow admission of sealant material between the two mating parts and around the fasteners. Apertures 30 and 31 are drilled so that they communicate with groove 17 which must normally be enlarged at the locations of these additional apertures by spot facing or other suitable means, as indicated at 17b. This enables the heads 32 of each of rivets 29 to be wholly received within the groove so that when the sealant is injected it will extend completely around and over the head of the rivet. It is preferable to use a rivet of the flush type, as illustrated, and countersink the bottom of the groove at apertures 31 and 32 so that the rivet head will be flush with the bottom of the groove. With such a flush installation the sealant material can flow freely along the groove and provide an adequate seal without danger of a void within the groove, or a sealant area of inadequate dimensions. However, it is possible to use a rivet having a shallow head, less in height than the depth of the groove, so that the sealant will in every case pass over and around the rivet. In this manner the nut plate is secured to the inner surface of flange 12, but fluid is precluded from traveling beyond the head of the rivet and therefore cannot pass out of the tank through the joint where the two parts are held together. It is obvious that this nut plate arrangement will seal equally well if groove 17 were in the skin portion rather than in the flange. In such an embodiment the flange would be countersunk to receive the heads of the flush-type rivets, and the groove in the skin portion would be enlarged at these locations so that sealant would extend over and around the rivet heads.

Figure 13:
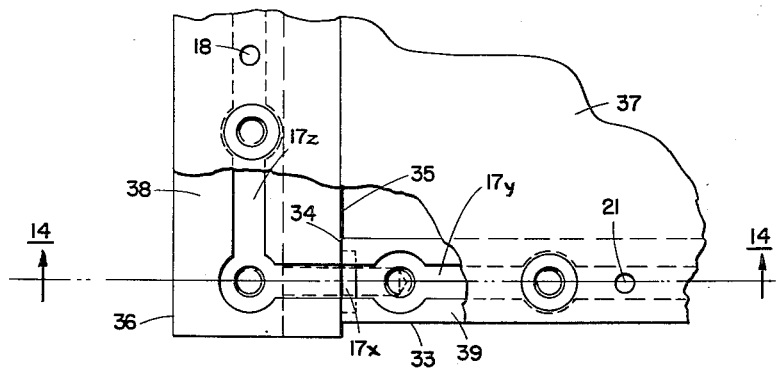
Fig. 13 is a top plan view, partially broken away, of an arrangement for sealing a corner.
Figure 14:
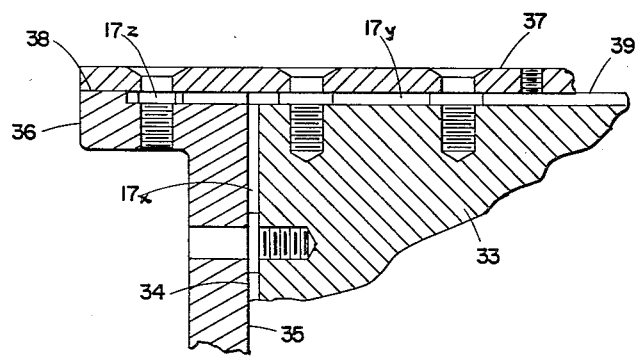
Fig. 14 is a sectional view along line 14—14 of Fig. 13.

One of the advantages realized from this invention is the ability to provide a unitary seal around all of the mating surfaces of a tank regardless of how these surfaces join each other. A fragmentary view of a corner of a tank is shown in Figs. 13 and 14, wherein the fasteners have been omitted for purposes of clarity. It is possible by this invention to provide a single unitary seal for all of the engaging surfaces at such a corner. In this example, one edge 34 of side 33 of the tank engages surface 35 of adjoining side 36. Also, side 37 mates with the top surface 38 of side 36, and with surface 39 of side 33. The joints between all of these overlapping surfaces must be sealed to prevent leakage from the interior of the tank. For this purpose a sealant groove of either constant cross-section or varying cross-section is provided in one of each of the mating surfaces. These grooves should be arranged so that they are all in open communication with each other. Thus groove 17x in surface 34 of side 33 opens into groove 17y in top edge 39 of this side. The latter groove continues into member 36 where it meets groove 17z, which is at right angles to groove 17y. After the sides have been assembled by means of fasteners through the various sides passing through the sealant grooves, the sealant material may be injected into one of the grooves—for example through aperture 18 into groove 17z—from whence it will travel into grooves 17y and 17x so as to completely fill all the grooves and seal all the joints. Aperture 21 may be provided for indicating when the grooves have been filled with sealant.

It should be obvious from the above description that the seal of this invention could be used as well in preventing fluid from entering a structure as for precluding escape of fluid. Accordingly, this seal can be used in the hull of a boat, or a seaplane, in rendering it water-tight, as well as for retaining fluid in tanks.

It is not necessary to this invention to provide flanges and skin portions of the type described above. In any case where members are in engagement with each other and held together by fasteners the seal of this invention can be used to make the joint between the overlapping parts fluid-tight. In other words, the particular arrangements of the grooves, the apertures and the sealant material are the important considerations, and not the particular members which are joined and sealed.

Although the invention has been described and illustrated in detail this is to be clearly understood as by way of example only and is not to be interpreted as a limitation, the spirit and scope of this invention being limited only by the appended claims.

I claim:

1. In an aircraft, a fuel tank comprising a plurality of sides defining a hollow receptacle provided with mutually contacting overlapping surfaces, at least one of said sides being a wing skin of such an aircraft, a plurality of fasteners in spaced relationship along said contacting surfaces and extending through said overlapping surfaces so as to interconnect said sides, said fasteners communicating with the interior of said receptacle, one of said overlapping surfaces having a continuous elongated relatively shallow groove therein extending between said fasteners in an interconnecting relationship, said groove being of substantially constant width of smaller lateral dimensions than the diameters of said fasteners at locations between said fasteners, and of greater lateral dimensions than said diameters at the locations of said fasteners so that said groove provides an open channel along said overlapping surfaces, a plurality of injection apertures communicating with said groove from the exterior thereof, plug means in said injection apertures for sealing the same, and a non-hardening sealant material entirely filling said groove for preventing egress of fluid from said receptacle along said overlapping surfaces and at said fasteners.

2. In an aircraft, a fuel tank comprising a plurality of sides defining a hollow receptacle, said sides joining at mutually contacting overlapping surfaces, one of each such joining sides being a skin of a wing of such an aircraft and the other such side being a structural member of said wing, said joining sides having aligned apertures therethrough extending between the exterior and interior of said receptacle at said overlapping surfaces, said structural member having a continuous elongated relatively shallow groove in the overlapping surface thereof extending between said apertures, said groove being of smaller lateral dimensions than the widths of said apertures at locations between said apertures, and of greater lateral dimensions than said apertures at the locations thereof so as to provide a continuous channel between and around said apertures, a fastener in each of said apertures for securing together said skin and said member, a non-hardening sealant material in said groove entirely filling the same for preventing egress of fluid from said receptacle between said overlapping surfaces and through said apertures, said wing skin having a plurality of additional apertures extending from the exterior of said receptacle to said groove for permitting injection of said sealing material into said groove, and removable plug means in said additional apertures for retaining said non-hardening sealant in said groove.

3. The method of providing a sealed joint between two members having surfaces in overlapping engagement comprising the steps of forming a plurality of alignable fastener openings through said overlapping portions, forming in interconnecting relationship between said fastener openings a relatively shallow groove in one of said overlapping surfaces of a lateral dimension between said fastener openings less than the diameter of said openings, enlarging said groove at the location of each of said openings to a lateral dimension greater than the diameter of the opening arranged to encompass the opening at such location, forming an aperture extending from the exterior of one of said members to said groove, securing said members together by means of fasteners through said fastener openings, injecting a non-hardening sealant material into said groove through said aperture so as to completely fill said groove including the portions thereof around said fasteners for sealing along said overlapping surfaces and through said fastener openings, and inserting plug means in said aperture for retaining said sealing material in said groove.

4. The method of connecting two members so as to provide a fluid-tight joint comprising the steps of forming substantially complementary surface portions on said members, forming alignable fastener openings through said members communicating with said surface portions, forming in said surface portion of one of said members at the location of each fastener opening therein a substantially circular relatively shallow groove concentric with and of larger diameter than the diameter of the fastener opening where the same is located, forming in said surface portion between adjacent circular grooves a relatively shallow interconnecting groove of smaller lateral dimensions than the diameter of said circular grooves so as to provide by said grooves a continuous channel between and around said fastener openings, connecting said members with said complementary surface portions in abutting engagement by means of fasteners extending through said fastener openings, forming a series of injection apertures through one of said members from the exterior thereof to said interconnecting groove, injecting a non-hardening sealant material through said injection apertures so as to completely fill all portions of said grooves, and closing said injection apertures by inserting removable plug means therein for retaining said non-hardening sealant in said grooves.

(References on following page)

References Cited in the file of this patent

UNITED STATES PATENTS

| | | | |
|---|---|---|---|
| Re. 21,524 | Gramelspacher | Aug. 6, | 1940 |
| 837,767 | Aims | Dec. 4, | 1906 |
| 1,191,547 | Wiedeman | July 18, | 1916 |
| 1,331,150 | Hooper | Feb. 17, | 1920 |
| 1,515,996 | Buchanan | Nov. 18, | 1924 |
| 1,698,255 | Carns | Jan. 8, | 1929 |
| 1,800,085 | Kroeger | Apr. 7, | 1931 |
| 1,958,142 | Holthe | May 8, | 1934 |
| 2,140,672 | Gray et al. | Dec. 20, | 1938 |
| 2,150,546 | Flader | Mar. 14, | 1939 |
| 2,240,310 | McKay | Apr. 29, | 1941 |
| 2,397,184 | Klose | Mar. 26, | 1946 |
| 2,559,806 | Thompson | July 10, | 1951 |
| 2,591,044 | Bomhardt et al. | Apr. 1, | 1952 |
| 2,689,698 | Agnew | Sept. 21, | 1954 |